UNITED STATES PATENT OFFICE.

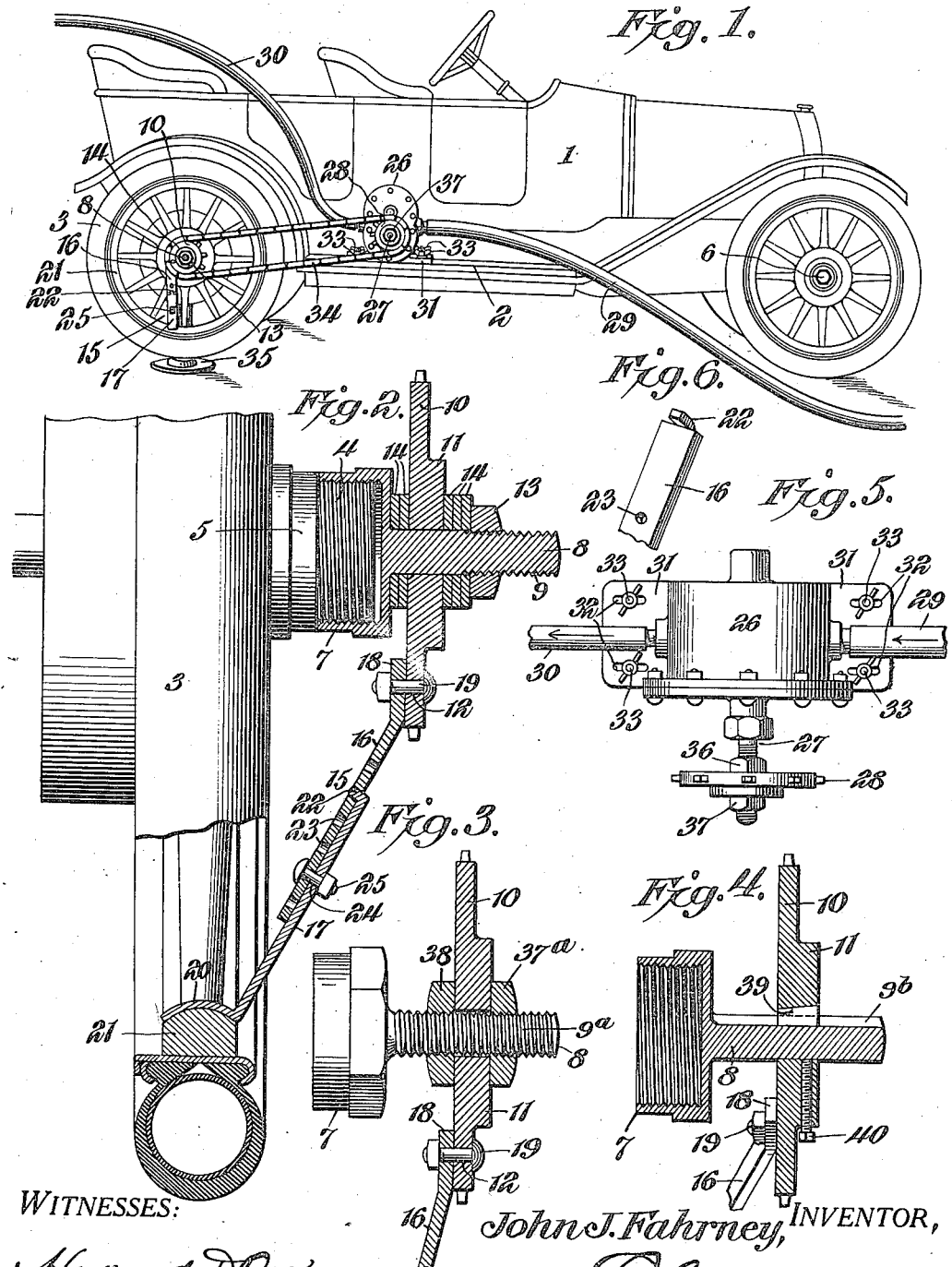

JOHN J. FAHRNEY, OF TIMBERVILLE, VIRGINIA, ASSIGNOR OF ONE-HALF TO JOHN T. HELBERT, OF TIMBERVILLE, VIRGINIA.

WATER-PUMP ATTACHMENT FOR AUTOMOBILES.

1,236,554.   Specification of Letters Patent.   Patented Aug. 14, 1917.

Application filed October 21, 1915, Serial No. 57,195. Renewed December 8, 1916. Serial No. 135,886.

*To all whom it may concern:*

Be it known that I, JOHN J. FAHRNEY, a citizen of the United States, residing at Timberville, in the county of Rockingham, and State of Virginia, have invented a new and useful Water-Pump Attachment for Automobiles, of which the following is a specification.

This invention has reference to water pump attachments for automobiles, and its object is to provide a readily installed and demounted pump for supplying water under pressure by power supplied from the automobile in order to wash the vehicle, or for supplying water for other purposes.

In accordance with the present invention there is provided a water pump of any suitable construction arranged for connection to the driving axle of the automobile so as to be driven by the automobile engine. The driving means comprises a sprocket wheel and spindle therefor so constructed that the spindle may replace the dust cap on one of the rear wheels of the vehicle, while the pump has a base portion with suitable flanges having elongated slots so that the pump may be mounted on and secured to the running board of the vehicle. Furthermore, provision is made whereby the pump and sprocket wheel applied to the rear wheel hub may be properly alined. There is also provided an adjustable strut arranged at one end for connection to the sprocket wheel and at the other end shaped to bear against the felly of the vehicle wheel, so that the sprocket wheel does not have to be fixed so firmly to the spindle as to resist turning strains, the strut serving as a means for establishing such resistance. Because of the presence of the strut no tools are needed in the application of the device to the automobile, it being quite possible to apply sufficient fastening forces by the hand of the operator and without the aid of tools.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings but may be changed and modified so long as such changes and modifications come within the scope of the appended claims.

In the drawings:—

Figure 1 is a side elevation of an automobile with the invention applied.

Fig. 2 is a view partly in section and partly in elevation of a part of a rear wheel of an automobile with the invention applied.

Fig. 3 is a diametric section of the rear wheel sprocket with the carrying spindle shown in elevation and illustrating a somewhat different arrangement of fastening means than shown in Fig. 2.

Fig. 4 is a longitudinal section of the sprocket wheel and carrying spindle, slightly modified over the showings of the other figures.

Fig. 5 is a plan view of the pump.

Fig. 6 is a detail perspective view of one end of one member of the strut.

Referring to the drawings there is shown in Fig. 1 an automobile 1 of which the running board 2 and one of the rear wheels 3 will be hereinafter referred to.

The rear wheel 3 has a threaded outer end 4 of its hub 5, which threaded end customarily receives a dust cap, such a cap being shown at 6 applied to one of the front wheels of the automobile in Fig. 1. Adapted to the threaded end 4 is an internally threaded cap member 7 provided with an axially extended stem 8 having screw threads 9 thereon extending from the outer end toward the cap member for a portion of the length of the stem or spindle 8, as indicated in Fig. 2 or throughout practically the full length of the spindle, as indicated at 9ª in Fig. 3, or the spindle 8 is smooth throughout its length and is provided with a longitudinal key-way 9ᵇ, as shown in Fig. 4.

Adapted to the stem or spindle 8 to move lengthwise of said spindle is a sprocket wheel 10 having an axially extended hub portion 11. The wheel has at one point between its center and circumference a passage 12 for a purpose which will hereinafter appear.

The internally threaded cap member 7 is adapted to the screw threaded end 4 of the hub 5 to be screwed thereonto after the removal of the dust cap, and then the spindle 8 projects from the hub in alinement therewith. The sprocket wheel 10 when applied to the spindle 8 is held thereon by a nut 13 with washers 14 on the spindle between the nut and the hub 11 and between the cap 7 and wheel 10, the number of washers varying in accordance with circumstances and the hub 11 being directed away from the cap 7 or toward the cap 7 also in accordance with circumstances.

It is designed to apply the nut 13 and screw it up by hand, wherefore the degree of friction holding the sprocket wheel 10 against rotation on the spindle is relatively slight. To prevent the sprocket wheel 10 from turning on the spindle there is provided a strut 15 which in the showing of the drawings is made up of two members 16, 17, respectively. The member 16 has one end 18 bent at an angle and suitably perforated for the passage of a bolt 19, which bolt also passes through the perforation 12, thereby securing the member 16 of the strut to the sprocket wheel 10. The other member 17 of the strut has one end 20 bent into general conformity with the cross-sectional shape of the felly 21 of the wheel 3, so as to bear smoothly against the inner periphery thereof. The other end of the member 17 is provided with a tooth 22 adapted to enter any one of a number of perforations 23 in the member 16 of the strut, these perforations being near the end of the member 16 opposite the angle portion 18. At a suitable distance from the tooth 22 the member 17 is provided with a perforation 24 matching some one of the perforations 23 when the tooth 22 is in one of such perforations and a bolt 25 extending through the matching perforation serves in conjunction with the tooth 22 to hold the two members of the strut in firm alined position. The arrangement is such that when the sprocket wheel 10 is mounted on the spindle 8 the end or foot 20 of the strut so engages the felly 21 as to receive the thrust of the sprocket wheel 10 tending to turn the latter about the spindle. It is therefore possible to hold the sprocket wheel 10 on the spindle 8 with such force as may be applied to the nut 13 by the hands of the operator. When it is desired to remove the nut 13 it is quite possible to start and turn the nut in the unscrewing direction by such force as may be applied thereto by the fingers of the operator.

There is also provided a water pump 26 preferably of the rotary type and as there are numerous pumps on the market adapted to the purposes of the present invention the pump 26 may be a commercial form of pump obtainable upon the market, wherefore there is no need of any special description of the pump. The pump 26 is shown as provided with a shaft 27 upon which is mounted a sprocket wheel 28. The pump is also provided with an inlet pipe 29 and an outlet pipe 30, which latter in the particular showing of the drawings is of smaller diameter than the pipe 29. The purpose of this is to provide relatively small resistance to the inflowing water, while the outflowing stream is of restricted size to insure ample pressure whereby the outflowing stream will issue from the outflow pipe with vigor.

The pump 26 has base flanges 31 at opposite ends with each flange having slots 32 elongated in the direction of the length of the base. Extended through the slots are wing nut bolts 33. These bolts are the only parts of the whole structure which demand any change of any kind in the automobile and the presence of the bolts 33 means no more than the boring of four small holes through the footboard 2, such holes being unnoticeable and unobjectionable to an automobile owner. When the pump is in place on the running board 2 and is clamped thereto by the wing bolts 33, the sprocket wheels 10 and 28 are connected by a sprocket chain 34, so that on power being applied to the rear axle by the engine of the automobile and the rear wheel 3 being elevated as by a lifting jack 35, rotative motion is imparted to the sprocket wheel 10 mounted on the spindle 8 by the frictional engagement of the sprocket wheel with the spindle and the thrust of the strut 15. Rotative movement is imparted to the pump shaft 27 by the chain 34 and sprocket wheel 28 and water is delivered by the pump through the outlet pipe 30, which may be in the form of a hose with a suitable nozzle, preferably of the combined sprinkling and stream type.

When the pump 26 is applied to the running board 2 the sprocket wheel 28 projects laterally from the body of the vehicle and is arranged in alinement with the sprocket wheel 10. This alining of the sprocket wheels is brought about by a suitable disposition of the washers 4 in the structure of Fig. 2 or by nuts 36, 37 applied to the shaft 27, which is suitably threaded for the purpose, so as to clamp the sprocket wheel 28 between them, as in Fig. 3.

The elongated spindle 8, as well as the elongated shaft 27, and the means whereby the sprocket wheels 10 and 28 are adjusted longitudinally of the spindle and shaft permits the alining of the sprocket wheels for automobiles of different makes.

The pump 26 has a fixed relation to the running board so far as its distance from the body of the automobile is concerned, although it may be adjusted lengthwise of the running board to permit the ready application of the chain 34 and the subsequent taking up of slack from the chain. After the position of the sprocket wheel 28 has been ascertained, it is unnecessary to readjust it.

With the device of the present invention the pump and the sprocket wheel 10 with its carrying spindle 8 are removed from the working positions and stored away either on the vehicle or elsewhere. When it is desired to use the pump, as, for instance, after a road run and the vehicle needs washing, the dust cap of one of the rear wheels is removed, the screw cap 7 is screwed upon the threaded end 4 of the hub 5 as tightly as may conveniently be done by hand, the sprocket wheel 10 is placed upon the spindle 8 with the washers 14 suitably placed to bring the wheel into alinement with the sprocket wheel 28, with the hub 11 toward the hub of the wheel or directed away therefrom, as the case may be, and the strut 15 properly connected to the wheel 10 and in proper relation to the felly 21, the chain 34 being applied and the rear wheel 3 jacked up. On starting the automobile engine the rear wheel 3 is caused to revolve and the pump is set into motion. Water ejected from the pipe or hose 30 may be used for washing the vehicle or for any other purpose for which is it adapted.

The longitudinally extensible and contractible strut provides for different diameters of wheels.

In the form of spindle shown at 9ª in Fig. 3 the sprocket wheel 10 is held to and adjusted along the spindle by nuts 37ª, 38 applied to the spindle on opposite sides of the sprocket wheel. In the form of adjustment shown in Fig. 4 the sprocket wheel 10 has a key 39 adapted to enter the key-way 9ᵇ, while a set screw 40 traversing the hub 11 serves to lock the sprocket wheel 10 in any position of longitudinal adjustment along the spindle 8.

The whole device is readily attachable to and removable from an automobile and readily adapted to different makes of automobiles without any change whatsoever in the device and requiring only the boring of four small holes through the footboard 2.

The whole device is of moderate cost of construction and high efficiency in operation and is readily operable by the engine of the automobile. The water delivered by the pump may be used for washing the automobile, whereby the vehicle may be kept clean with the least amount of trouble. Moreover, the water delivered by the pump may be used for various washing purposes, the vehicle being readily movable from place to place.

What is claimed is:—

1. A water pump attachment for automobiles comprising a water pump having means for securing it to the running board of the automobile, and driving connections for the pump including a screw cap adapted to replace the dust cap of one of the automobile wheels, said screw cap having an axially extended spindle, a sprocket wheel adapted to said spindle, sprocket connections between the sprocket wheel and the pump, and a strut extending from the sprocket wheel on the spindle to the felly of the wheel for propelling the sprocket wheel irrespective of connections between the sprocket wheel and spindle carrying it.

2. A water pump attachment for automobiles comprising a water pump having means for securing it to a part of the automobile, a cap member adapted to replace the dust cap of one of the drive wheels of the automobile, a sprocket wheel carried by the screw cap, driving connections between the sprocket wheel and the pump, and a thrust member connected at one end to the sprocket wheel and at the other end adapted to bear against a portion of the driving wheel to propel the sprocket wheel irrespective of its connection with the screw cap.

3. A water pump attachment for automobiles comprising a water pump having means for securing it to a part of the automobile, a cap member adapted to replace the dust cap of one of the drive wheels of the automobile and provided with an axially extended spindle, a sprocket wheel adapted to the spindle, means for holding the sprocket wheel at different adjusted positions along the spindle, sprocket connections from the sprocket wheel to the pump, and a strut having means at one end for securing it to the sprocket wheel and at the other end formed to bear against a portion of the driving wheel to propel the sprocket wheel irrespective of its connection with the screw cap.

4. A water pump attachment for automobiles comprising a water pump having means for securing it to a part of the automobile, a cap member adapted to replace the dust cap of one of the drive wheels of the automobile and provided with an axially extended spindle, a sprocket wheel adapted to the spindle, means for holding the sprocket wheel at different adjusted positions along the spindle, sprocket connections from the sprocket wheel to the pump, and a strut having means at one end for securing it to the sprocket wheel and at the other end formed to bear against a portion of the driving wheel to propel the sprocket wheel irrespective of its connection with the screw cap, said strut being composed of parts movable lengthwise upon each other with means for holding them in adjusted positions, whereby the length of the strut may be varied.

5. A water pump attachment for automobiles comprising a water pump having means for securing it to a part of the automobile, a sprocket wheel and carrier therefor having means for attachment to one of the drive wheels of the automobile, sprocket devices for connecting the sprocket wheel to the pump to drive the latter from the drive wheel of the automobile, and means connected to the sprocket wheel and adapted to engage the drive wheel, whereby motion is imparted to the sprocket wheel from the drive wheel irrespective of the support of the sprocket wheel upon the drive wheel.

In testimony, that I claim the foregoing as my own, I have hereto affixed my signature in the presence of two witnesses.

JOHN J. FAHRNEY.

Witnesses:
R. L. MILLER,
M. O. MILLER.